United States Patent [19]

Jones, Jr.

[11] 4,245,802

[45] Jan. 20, 1981

[54] STEERING AND STABILIZATION APPARATUS FOR ROTARY WING AIRCRAFT

[76] Inventor: Allen Jones, Jr., 5028 Lauderdale Ave., Virginia Beach, Va. 23455

[21] Appl. No.: 4,720

[22] Filed: Jan. 19, 1979

Related U.S. Application Data

[60] Division of Ser. No. 822,227, Aug. 5, 1977, Pat. No. 4,135,687, which is a continuation-in-part of Ser. No. 661,626, Feb. 26, 1976, Pat. No. 4,040,373, which is a continuation-in-part of Ser. No. 579,896, May 22, 1975, abandoned, which is a continuation-in-part of Ser. No. 566,353, Apr. 9, 1975, Pat. No. 3,995,575, which is a continuation-in-part of Ser. No. 279,714, Aug. 10, 1972, Pat. No. 3,881,438.

[51] Int. Cl.³ .................. B64C 9/02; B64C 9/32
[52] U.S. Cl. ..................... 244/17.19; 244/87; 244/90 R; 244/113; 114/163
[58] Field of Search ........ 244/6, 17.11, 17.19, 244/87–91, 113, 48, 49, 45 A; 114/332, 145 R, 163, 165

[56] References Cited

U.S. PATENT DOCUMENTS

| D. 152,161 | 12/1948 | Knack | 244/17.19 |
|---|---|---|---|
| 1,250,987 | 12/1917 | DeGraw | 114/332 |
| 2,074,765 | 3/1937 | Adams | 244/88 |
| 2,630,984 | 3/1953 | Ballaver | 244/88 |
| 2,630,985 | 3/1953 | Sherry | 244/17.9 |
| 3,756,529 | 9/1973 | Backlund | 244/48 |

FOREIGN PATENT DOCUMENTS

| 520607 | 3/1955 | Italy | 244/17.19 |
|---|---|---|---|
| 606420 | 8/1948 | United Kingdom | 244/17.19 |

Primary Examiner—Galen L. Barefoot

[57] ABSTRACT

A rotary wing aircraft is provided with at least one pair of vane members mounted on opposite sides of the body thereof. Each vane member includes a substantially planar flared section and a mounting section; each of such vane member mounting sections being positioned alongside such aircraft body and being rotatable about a substantially horizontal common axis passing therethrough. Such vane member flared sections extend in planes which obliquely intersect such common axis. Such vane members are selectively counter-rotatable to move such flared sections thereof into and out of alignment with the airstream moving rearwardly alongside the body of such aircraft as the same moves forwardly through the air to concurrently serve steering and banking functions and are further rotatable in unison to serve a pitching function.

2 Claims, 3 Drawing Figures

STEERING AND STABILIZATION APPARATUS FOR ROTARY WING AIRCRAFT

The present application is a division of application Ser. No. 822,227, filed Aug. 5, 1977, to become U.S. Pat. No. 4,135,687 dated Jan. 23, 1979, which is a continuation-in-part of application Ser. No. 661,626, filed Feb. 26, 1976, now U.S. Pat. No. 4,040,373, issued Aug. 9, 1977, which was a continuation-in-part of application Ser. No. 579,896, filed May 22, 1975, now abandoned, which was a continuation-in-part of application Ser. No. 566,353, filed Apr. 9, 1975, now U.S. Pat. No. 3,995,575, issued Dec. 7, 1976, which in turn was a continuation-in-part of application Ser. No. 279,714, filed Aug. 10, 1972, now U.S. Pat. No. 3,881,438, issued May 6, 1975.

The present invention relates to steering and stabilization apparatus for rotary wing aircraft.

The instant invention stems from a recognition of the desirability of providing rotary wing aircraft with steering and stabilizing apparatus operable to coordinate concurrent turning and banking functions thereof for facilitating stable steering maneuvers cooperable with conventional control means presently provided for such rotary wing aircraft.

Accordingly, it is an object of the present invention to provide a novel and improved steering and stabilizing apparatus for rotary wing aircraft.

Another object of the instant invention is the provision of rotary wing aircraft with improved steering, stabilization and bank control apparatus.

According to the present invention, the foregoing and other objects are attained by providing at least one pair of vane members rotatably mounted on opposite sides of the body of a rotary wing aircraft. Each of such vane members includes a mounting section extending substantially alongside the body of such aircraft, and further includes a planar flared section which flares outwardly from the mounting section thereof. Such vane members are movably mounted on the body of such aircraft to rotate about an axis perpendicular to the plane of symmetry of the body of such aircraft extending through the mounting section of each of such vane members. The planar outwardly flared sections of such vane members are counter-rotatable to selectively expose their upper or lower surfaces to the flowstream passing rearwardly alongside the body of such aircraft as the same moves forwardly through the air to concurrently serve steering and banking functions. Such vane members are also rotatable in unison in the same direction to serve a pitching function.

A more complete appreciation of the invention and many of the attendant advantages thereof will be readily apparent as the same becomes better understood by reference to the following detailed description when considered in connection with the accompanying drawing wherein.

Figure 1:
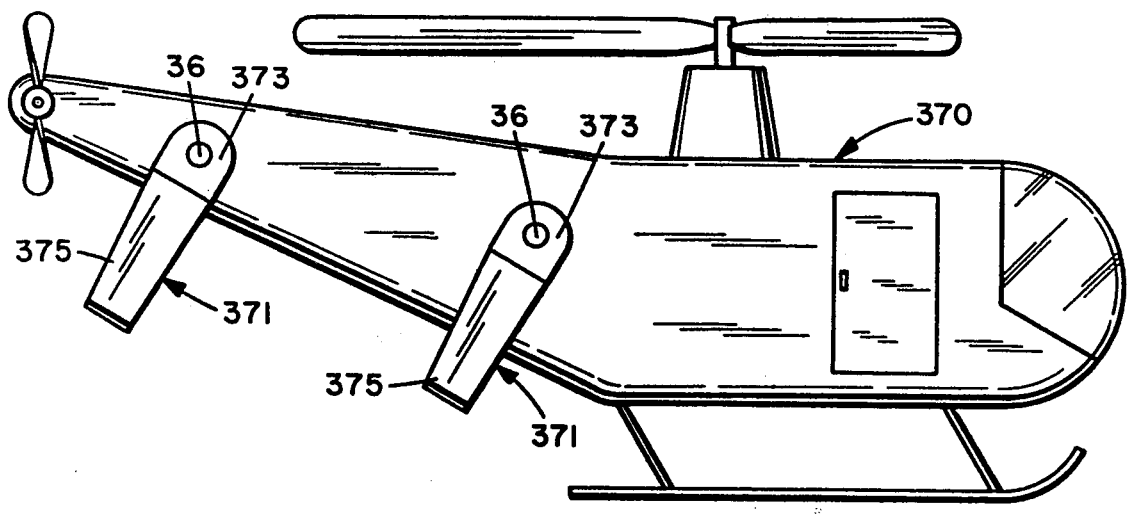
FIG. 1 is a side elevational view of a rotary wing aircraft employing vane members according to the present invention.
Figure 2:
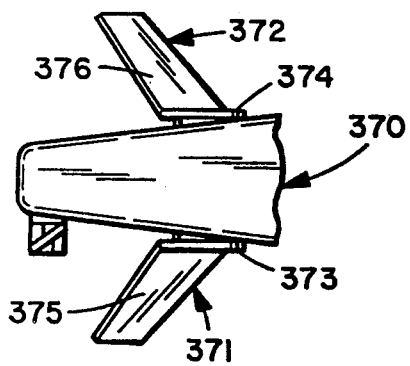
FIG. 2 is a partial top plan view of the aircraft of FIG. 1 showing a pair of the vane members employed therewith; and, FIG. 3 is a rear elevational view of one of the vane members employed with the aircraft of FIG. 1.
Figure 3:
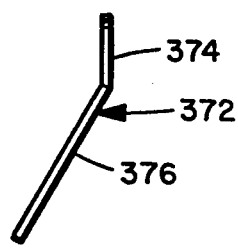

Referring now more particularly to the drawing, wherein like reference numerals designate the same or identical parts throughout the several views, there is shown a rotary wing aircraft, generally designated by the reference numeral 370. Aircraft 370 is provided on opposite sides of the body thereof with vane members, generally designated 371, 372. The vane members 371, 372 include mounting sections 373, 374, respectively, which extend substantially alongside the body of aircraft 370, and further include flared planar sections 375, 376, respectively, which flare outwardly from the mounting sections 373, 374 thereof, respectively, and which are operationally substantially downwardly directed. The vane members 371, 372 are movably mounted on the body of aircraft 370 to rotate in pairs about axes perpendicular to the plane of symmetry of the body of aircraft 370. A drive mechanism such as the drive mechanism 40 shown in FIG. 8 of the drawings of applicant's U.S. Pat. No. 4,040,373, issued Aug. 9, 1977, and fully structurally and functionally described in the specification thereof, may be effectively utilized to move the vane members 371, 372; the shaft 36 of such a drive mechanism being centrally connected to the mounting section 373 of a vane member 371 and the shaft 37 of such a drive mechanism being centrally connected to the mounting section 374 of an associated vane member 372.

Although a forward pair of vane members 371, 372, as well as a rearward pair of vane members 371, 372 are shown carried by aircraft 370 in FIG. 1, it will be apparent that this tandem arrangement of two pairs of such vane members 371, 372 may be modified. For example, only one pair of vane members 371, 372 may be provided on an aircraft 370, or, alternatively, more than two pairs of such vane members 371, 372 may be carried by an aircraft 370.

The vane members 371, 372 operate to provide control functions for the aircraft 370. More particularly, it will be seen that when the vane members 371, 372 are counter-rotated from vertically downwardly and outwardly directed positions, the upper surface of either the flared planar section 375 of vane members 371 or the flared planar section 376 of vane members 372 will be exposed to the flowstream moving rearwardly alongside the body of aircraft 370 as the same moves forwardly through the air, while the lower surface of the flared planar section of the other of such vane members will be similarly exposed to such flowstream. The vane members 371, 372 thereby serve to steer the aircraft 370 to port or starboard and concurrently serve to properly bank the aircraft 370 in the direction of turn. Such coordinated steering and banking functions of the vane members 371, 372 facilitate stable turning maneuvers of the aircraft 370. Further, the vane members 371, 372 are operable to provide pitch control for the aircraft 370. Both of such vane members 371, 372 may be concurrently rotated rearwardly, as illustrated in the drawing, to guide the aircraft 370 upwardly, and may be concurrently rotated forwardly to guide the aircraft 370 downwardly. The vane members 371, 372 according to the present invention are cooperable with conventional control means provided for the aircraft 370 for augmenting the function thereof.

Obviously, many variations and modifications of the present invention are possible in the light of the foregoing teachings. It is therefore to be understood that within the scope of the appended claims the invention may be practiced otherwise than as specifically described.

What is claimed is:

1. A rotary wing aircraft, comprising:

an elongated body;

a pair of elongated vane members having substantially planar flared sections with inboard ends projecting outwardly and downwardly from opposite sides of said body and having mounting sections nearer said body than said flared sections thereof; and, mounting means interconnecting said mounting sections with said body for rotary movement about a substantially horizontal common axis substantially perpendicularly disposed with respect to the plane of symmetry of said body; said flared section of each of said vane members extending in a plane which obliquely intersects said common axis inwardly of said mounting section, each of said vane members being rotatable about said common axis in the same or opposite directions and thereby rotatably movable into and out of alignment with the airstream passing rearwardly alongside said body when said aircraft is moving forwardly to concurrently serve steering and banking functions.

2. The rotary wing aircraft of claim 1, wherein a second pair of vane members are similarly mounted on said body and are similarly operable.

* * * * *